United States Patent Office 3,427,271
Patented Feb. 11, 1969

3,427,271
NOVEL ORGANOSILICON COMPOSITIONS
Robert L. McKellar, Midland, Mich., assignor to Dow Corning Corporation, Midland, Mich., a corporation of Michigan
No Drawing. Filed Nov. 4, 1966, Ser. No. 591,957
U.S. Cl. 260—29.2   9 Claims
Int. Cl. C08g 31/20, 53/18, 47/02

---

ABSTRACT OF THE DISCLOSURE

Organosilicon compositions that are particularly useful as water dispersible waxes. Illustrative of the organosilicon composition is one of the formula

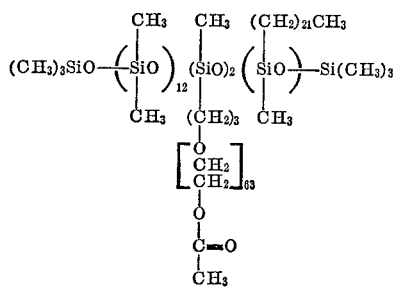

---

This invention relates to novel organosilicon compositions and more particularly to novel organosilicon compositions that are useful as water dispersable waxes and as antistatic agents for plastics and the like.

Water dispersable waxes which contain silicon would be extremely useful for numerous applications. For example, because the wax is water dispersable, the need for an emulsifying agent in the wax would be precluded. In addition, due to the desirable properties imparted by silicon, the wax would exhibit excellent gloss as well as providing water repellent characteristics.

The novel organosilicon compositions described herein are also useful as antistatic agents for plastics and like materials. Hence, the compositions can be applied to vinyl upholstery and similar substrates, thus substantially reducing the static that may occur.

In accordance with the above, it is therefore an object of the present invention to provide novel organosilicon compositions which are usfeul as water dispersable waxes and as antistatic agents for plastics and the like.

It is also an object of this invention to provide water dispersable waxes which impart other desirable properties which are obtained due to the inclusion of silicon.

Other objects and many of the attendant advantages of this invention will be readily appreciated as the same becomes better understood by reference to the following detailed description.

This invention relates to novel organosilicon compositions of the general formula

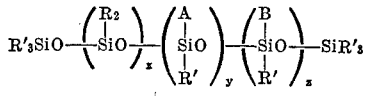

in which:

R is a member selected from the group consisting of a monovalent hydrocarbon radical or an $R_fCH_2CH_2$— radical in which $R_f$ is a perfluoroalkyl radical containing less than 5 carbon atoms,
A is a higher alkyl radical of at least 20 carbon atoms,
B is a radical of the formula —$(CH_2)_aO(CH_2CH_2O)_bQ$, in which Q is a member selected from the group consisting of a hydrogen atom, a hydrocarbon radical containing less than 9 carbon atoms, a

radical, a

radical, or a

radical,
a is an integer of at least 2, and b is an integer of from 2 to 150 inclusive,
R' is a member selected from the group consisting of R radicals, A radicals, or B radicals,
x is an integer of from 2 to 300 inclusive,
y is a positive integer including 0,
z is a positive integer including 0, and
when the sum of y+z is at least 1, then the ratio of x to y+z is at least 2 to 1,
there being at least one A radical and one B radical present per molecule.

In the above formula, R can be a monovalent hydrocarbon radical or $R_fCH_2CH_2$— radical in which $R_f$ is a perfluoroalkyl radical containing less than 5 carbon atoms such as the methyl, ethyl, propyl, isopropyl, butyl, isobutyl, amyl, hexyl, heptyl, phenyl, tolyl, cyclohexyl, methallyl, allyl, vinyl, 3,3,3-trifluoropropyl, and 3,3,4,4,5,5,5-heptafluoropentyl radical, among numerous others.

As related above, A is a higher alkyl radical of at least 20 carbon atoms such as the eicosyl, heneicosyl, pentacosyl, hexacosyl, triacontyl, tritriacontyl, tetracontyl, pentacontyl, and heptacontyl radical, etc.

As herein described, B is a radical of the formula —$(CH_2)_aO(CH_2CH_2O)_bQ$, in which Q is a member selected from the group consisting of a hydrogen atom, a hydrocarbon radical containing less than 9 carbon atoms, a

radical, a

radical, or a

radical, a is an integer of at least 2, and b is an integer of from 2 to 150 inclusive.

Illustrative examples of the Q radical when it is a hydrocarbon radical containing less than 9 carbon atoms are the methyl, ethyl, propyl, isopropyl, butyl, hexyl, phenyl, tolyl, and allyl radical, etc.

R' is representative of a member selected from the group consisting of R radicals, A radicals, or B radicals, hence it is of importance to note that the A radicals and B radicals can be present as end-blocking groups; they can be present along the chain, or they can be present at both or either site absent any resultant deleterious effects.

It is to be further noted that the consistency of the ultimate material can vary depending upon the amount of A radicals present in proportion to the value of x. Hence, if one desires a harder wax, it can be easily accomplished by increasing the amount of A radicals present in proportion to the value of x. Conversely, if a softer wax is required, the value of $x$ would be accordingly increased in proportion to the amount of A radicals present.

One method of preparing the compositions of this invention is to react an ethylene oxide polymer of the formula $CH_2=CH(CH_2)_wO[CH_2CH_2O]_bQ$ wherein $w$ is an integer of a least 0 and $b$ and Q are as above defined with an SiH containing siloxane in the presence of a platinum catalyst, e.g., chloroplatinic acid. The proportions of reactants are such that not all of the SiH is consumed. The addition product so obtained is then reacted with an olefin of at least 20 carbon atoms. If required, additional platinum catalyst may be added during the olefin reaction. In both cases the reaction proceeds via addition of the SiH to the C=C in the ethylene oxide polymer and the olefin.

In those cases where the ethylene oxide polymer is a solid, one should first melt the material and then add the SiH compound to form an intimate mixture of the two prior to the addition of the platinum catalyst. The mixture is then catalyzed and preferably heated at a temperature of 75° C. and 125° C. for approximately one hour or more. The olefin can then be added and heating continued for 30 minutes or more at the above temperature.

Any platinum catalyst is operative herein but the preferred form is chloroplatinic acid. Chloroplatinic acid is also known as "platinic chloride" or "acid platinic chloride." It is a commercially available material, and its preferred and most available form is as the hexahydrate, i.e., $H_2PtCl_6 \cdot 6H_2O$. This is a crystalline material which can be used in this invention either in its pure form or as a solution. It is readily soluble in polar solvents, e.g., alcohols, etc. For ease of handling and measuring the relatively minute amounts needed therein, the use of a solution of the catalyst is preferred. Since only minor amounts are required, the possible reactivity of the solvent with one of the reactants is of no particular importance.

An anhydrous form of the catalyst can also be employed if desired. Such forms can be readily prepared, e.g., by dehydrating the hexahydrate at very low pressures. Elevated temperatures are to be avoided in the dehydration, however, as there is considerable danger of causing some decomposition of the acid from such a process. Since no particular advantage is gained by using the anhydrous product, the hexahydrate itself is preferred, and it is the latter form which is referred to in this specification except where otherwise indicated.

The materials of this invention are particularly useful since they can be effectively employed as self-emulsifying waxes. For example, the waxes of this invention can be introduced in the presently popular automated car wash mechanisms wherein one would derive the benefit of obtaining a wax finish as well as the car wash.

The following examples are illustrative only and should not be construed as limiting the invention which is properly delineated in the appended claims.

EXAMPLE 1

To a 1 liter 3-necked flask was added 550 grams of

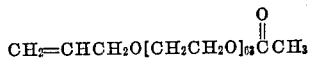

and 100 grams of a silicon hydride containing siloxane of the formula

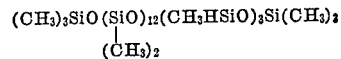

and heated in 40 grams of dry xylene to a temperature of 95° C. To the above was added 6 drops of a 2 percent solution of chloroplatinic acid in dimethylphthalate. The reaction was exothermic and the incompatible fluids became homogeneous. The mixture was stirred for 30 minutes at 100° C. and 164.5 grams of a mixed olefin of the formula $C_{22}H_{43}$ was added. The mixture was recatalyzed and heated to 108° C. for approximately 15 minutes. The admixture was stripped to 80° C. at 0.5 mm. Hg and a product of the average formula

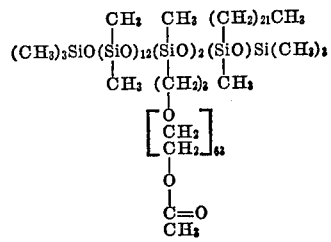

was recovered.

When the above product was dispersed in water, the resulting dispersion provided excellent gloss and the necessary wax characteristics when applied to the surface of an appropriate substrate.

EXAMPLE 2

When the following materials are substituted for the corresponding compounds of Example 1 in appropriate ratios, the following products are obtained.

| Ethylene Oxide Polymer | Silicon Hydride | Olefin |
|---|---|---|
| $CH_2=CHCH_2O[CH_2CH_2O]_{20}CH_3$ | $(CH_3)_3SiO(SiO)_6(CH_3HSiO)_2Si(CH_3)_3$ with side chain $CH_2$–$CH_2$–$CH_2$–$CF_3$ on one Si | $C_{30}H_{60}$ |
| (I) | $(CH_3)_3SiO(SiO)_6(SiO)_2(SiO)Si(CH_3)_3$ with side chains $CH_3$, $CH_2CH_2CF_3$, $(CH_2)_3CH_3$, $(CH_2)_{21}CH_3$, and $[OCH_2CH_2]_{50}OCH_3$ | |
| $CH_2=CHCH_2O[CH_2CH_2O]_{100}\overset{O}{\underset{\|}{C}}OC_2H_5$ | $(CH_3)_3SiO(SiO)_{100}(CH_3HSiO)_{20}Si(CH_3)_3$ with $CH_3CH_2$ side chain | $C_{40}H_{80}$ (cyclohexyl) |

| Ethylene Oxide Polymer | Silicon Hydride | Olefin |
|---|---|---|
| (2) 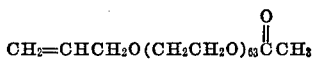 | 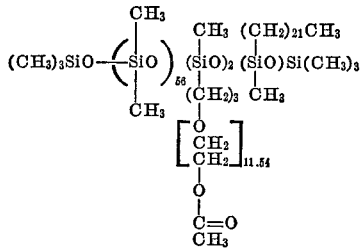 | |
| (3) 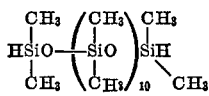 | 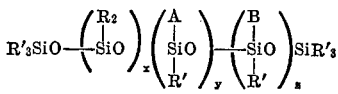 | $C_{60}H_{12}$ |
|  | 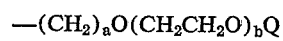 | |
|  |  | |
|  |  | |
|  |  | |

EXAMPLE 3

373.8 grams of $$CH_2=CHCH_2O(CH_2CH_2O)_{63}\overset{O}{\overset{\|}{C}}CH_3$$

was placed in a 1 liter 3-necked flask and heated to approximately 90° C. The above was then catalyzed with 6 drops of a 2 percent solution of chloroplatinic acid in isopropanol and a slow addition of 142.4 grams of

was made. The mixture was subsequently heated at approximately 90° to 100° C. for three hours and 60 grams of an olefin of the formula $C_{20}H_{39}$ was added. The admixture was then recatalyzed and heated to about 90° C. for 100 minutes. The admixture was stripped to 150° C. at 1.0 mm. Hg and a product of the formula

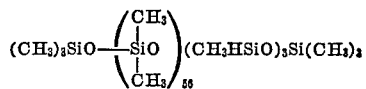

was recovered.

EXAMPLE 4

Into a 500 ml. 3-necked flask was placed 19.64 grams of $$CH_2=CHCH_2O(CH_2CH_2O)_{11.54}\overset{O}{\overset{\|}{C}}CH_3$$

100 grams of xylene, and 100 grams of a silicon hydride containing siloxane of the formula $$(CH_3)_3SiO{-}\!\!\left(\!\!\overset{CH_3}{\underset{CH_3}{Si O}}\!\!\right)_{\!\!56}\!\!(CH_3HSiO)_3Si(CH_3)_3$$

The mixture was heated to a temperature of 80° C. To the above was added 5 drops of a 2 percent solution of chloroplatinic acid in isopropanol. The admixture was then heated to approximately 104° C. for 30 minutes and 36.7 grams of an olefin of the formula $C_{22}H_{43}$ was added. The mixture was recatalyzed and stripped to 110° C. at 0.5 mm. Hg and a product of the formula $$(CH_3)_3SiO{-}\!\!\left(\!\!\overset{CH_3}{\underset{CH_3}{Si O}}\!\!\right)_{\!\!56}\!\!(SiO)_2(\overset{CH_3\ (CH_2)_{21}CH_3}{\underset{(CH_2)_3}{Si}}O)Si(CH_3)_3$$

with pendant $$\begin{bmatrix}CH_2\\CH_2\end{bmatrix}_{11.54}\!\!O\!-\!\overset{O}{\overset{\|}{C}}\!-\!CH_3$$

was recovered.

That which is claimed is:

1. An organosilicon composition of the general formula $$R'_3SiO{-}\!\!\left(\!\!\overset{R_2}{\underset{R'}{Si O}}\!\!\right)_{\!\!x}\!\!\left(\!\!\overset{A}{\underset{R'}{Si O}}\!\!\right)_{\!\!y}\!\!\left(\!\!\overset{B}{\underset{R'}{Si O}}\!\!\right)_{\!\!z}\!\!SiR'_3$$

in which:

R is a member selected from the group consisting of a monovalent hydrocarbon radical or a $R_fCH_2CH_2{-}$ radical in which $R_f$ is a perfluoroalkyl radical containing less than 5 carbon atoms, A is a higher alkyl radical of at least 20 carbon atoms, B is a radical of the formula $$-(CH_2)_aO(CH_2CH_2O)_bQ$$

in which Q is a member selected from the group consisting of a hydrogen atom, a hydrocarbon radical containing less than 9 carbon atoms, a $$-\overset{O}{\overset{\|}{C}}Q'$$

radical, a $$-\overset{O}{\overset{\|}{C}}OQ'$$

radical, or a $$-\overset{O}{\overset{\|}{C}}\overset{H}{\underset{}{N}}Q'$$

radical, in which Q′ is a member selected from the group consisting of a hydrogen atom and a hydrocarbon radical containing less than 9 carbon atoms, $a$ is an integer of at least 2, and $b$ is an integer of from 2 to 150 inclusive, R′ is a member selected from the group consisting of R radicals, A radicals, or B radicals, $x$ is an integer of from 2 to 300 inclusive, $y$ is a positive integer including 0, $z$ is a positive integer including 0, and when the sum of $y+z$ is at least 1, then the ratio of $x$ to $y+z$ is at least 2 to 1, there being at least one A radical and one B radical present per molecule.

2. The composition as recited in claim 1 wherein R is a methyl radical and R′ is a methyl radical.

3. The composition as recited in claim 2 wherein $x$ has a value of from 35 to 125, $y$ has a value of from 1 to 10, and $z$ has a value of from 1 to 10.

4. The composition as recited in claim 1 wherein one terminal R′ is an A radical, $y$ has a value of 0, R is methyl, and the remaining R′ radicals are methyl radicals.

5. The composition as recited in claim 1 wherein one terminal R′ is a B radical, $z$ has a value of 0, R is methyl, and the remaining R′ radicals are methyl radicals.

6. The composition as recited in claim 1 wherein the formula is:

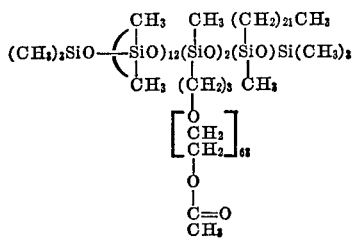

7. A dispersion of the composition of claim 6 in water.

8. The composition as recited in claim 1 wherein the formula is

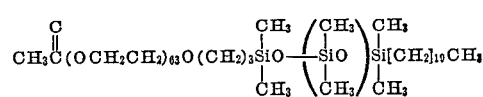

9. A dispersion of the composition of claim 8 in water.

References Cited

UNITED STATES PATENTS

| | | | |
|---|---|---|---|
| 2,991,300 | 7/1961 | Schmidt et al. | 260—448.2 |
| 3,298,919 | 1/1967 | Bishop et al. | 167—85 |

FOREIGN PATENTS

| | | |
|---|---|---|
| 955,916 | 4/1964 | Great Britain. |

JAMES A. SEIDLECK, *Primary Examiner.*

M. I. MARQUIS, *Assistant Examiner.*

U.S. Cl. X.R.

106—287; 260—46.5, 448.2